Figure 1:
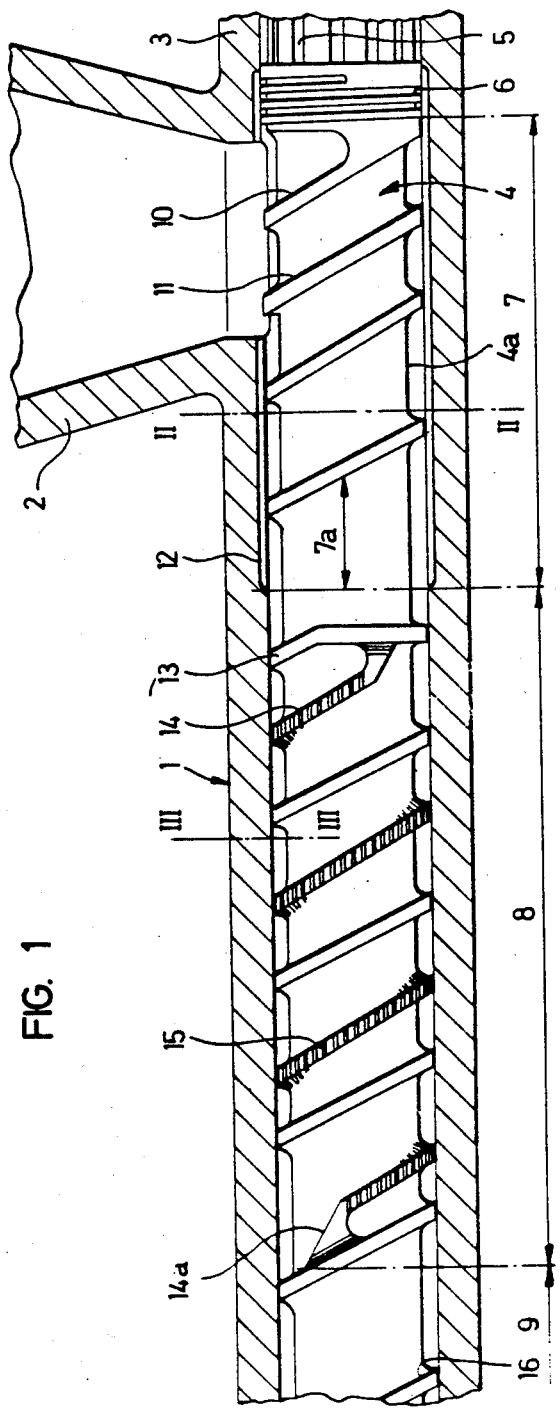

United States Patent [19]

Maillefer

[11] 4,171,196
[45] Oct. 16, 1979

[54] SCREW-TYPE PLASTICS EXTRUDER

[75] Inventor: Charles Maillefer, St. Sulpice, Switzerland

[73] Assignee: Maillefer S.A., Ecublens, Switzerland

[21] Appl. No.: 951,787

[22] Filed: Oct. 16, 1978

[30] Foreign Application Priority Data

Oct. 25, 1977 [CH] Switzerland .................. 12975/77

[51] Int. Cl.² .............................................. B29F 3/02
[52] U.S. Cl. ............................ 425/209; 264/176 R;
366/90; 366/81; 425/208
[58] Field of Search .......................... 425/209, 208;
264/176 R; 366/90, 81

[56] References Cited

U.S. PATENT DOCUMENTS

| 3,771,774 | 12/1973 | Hook | 366/81 |
|---|---|---|---|
| 4,085,461 | 4/1978 | Maillefer | 366/90 |
| 4,092,015 | 5/1978 | Koch | 425/209 |

*Primary Examiner*—William E. Schulz
*Attorney, Agent, or Firm*—Stevens, Davis, Miller & Mosher

[57] ABSTRACT

An improved screw-type extruder intended to increase the output obtainable from a machine of certain dimensions while maintaining a satisfactory quality of the material extruded. This result is obtained by providing in the homogenization zone a thread crossed by a multitude of narrow passages, and in the feed zone means for overfeeding the plasticizing zone. These overfeeding means may, for example, consist in providing in this zone a cylinder grooved longitudinally or spirally or a double-screw section producing a forced pushing of the material toward the plasticizing zone.

13 Claims, 5 Drawing Figures

SCREW-TYPE PLASTICS EXTRUDER

This invention relates to extruders. More particularly, it relates to high-output screw-type extruders for plastics.

As is well known, the function of a screw-type extruder is to transform a starting material, which is introduced into the hopper of the machine at ambient temperature in the form of pellets or power, into a completely homogeneous plasticized mass having a specific temperature and to force this mass under a specific pressure and at a specific rate into the extrusion head connected to the exit orifice of the machine. Thus the screw must convey the material from the entrance of the machine to the exit thereof while compressing it, must heat it to bring it into the desired state of plasticization, stir it up, and mix it to make it homogeneous.

On the other hand, the design of the extruders must satisfy the general requirements which are generally encountered in the machines. Thus, an extruder of a given size must be capable of furnishing as large an output as possible of plastic material suitable for molding.

All other parameters being equal, the output of material forced along by a screw to the exit of the cylinder depends upon the speed of rotation of the screw. However, the various parameters are not independent, and it is known that to obtain a fluid, homogeneous plastic material of good quality at the exit of the cylinder, it is essential to avoid localized overheating in the course of the travel of the plastic material in the cylinder, for localized overheating leads to partial deterioration of the plastic material. The limit at which this deterioration starts to take place determines a maximum speed of rotation for the screw, and this limit is called the thermal limit of useful output. In practice, the speed of rotation of the screw must remain at a value below the thermal limit if it is desired to obtain a homogeneous mass of good quality at the exit of the cylinder. It is to this second limiting speed that the qualitative limit of useful output corresponds.

It has already been proposed to provide spiralling grooves in part of the cylinder of an extruder. Thus, Swiss Pat. No. 551,853 describes a screw, the feed zone of which includes a cylinder portion grooved in this manner.

It has also been proposed to provide certain zones of an extruder screw with one or more threads interrupted in such a way as to be made up only of segments separated from one another, aligned along a spiral line. Canadian Pat. No. 942,014 provides passages of this sort, for instance. Their width is less than their height, but they are placed in a zone of widened diameter following the plasticizing zone. Moreover, the pitch of the thread is reversed with respect to the direction of movement of the plastic material.

U.S. Pat. No. 3,944,191 describes an extruder having a single-thread screw of constant pitch. The upstream part of this extruder is arranged in such a way as to cause a rapid increase in pressure in the mass of plastic material introduced into the cylinder. For this purpose, the cylinder may be grooved or may be frustoconical in shape, the screw likewise having a corresponding shape. In the downstream part of the extruder where the plastic material is homogenized, the thread of the screw exhibits passages constituted, for example, by slots connecting its downstream side to its upstream side. The purpose of this arrangement is to permit the use of extruders in injection molding operations. The extrusion nozzle is alternately opened and closed in order to allow an accumulation of material under pressure in front of the nozzle and rapid expulsion thereof when the latter is opened. The passages provided in the thread of the screw are intended to allow the back-flow of the plastic material and, consequently, a rapid decrease in pressure upon closing of the nozzle. Thus excessive stress on the elements of the extruder is avoided. In view of the function of the passages provided in the thread of the screw, it is obvious that if a screw of this type includes several threads overlapping one another, all the threads must be provided with passages.

German Disclosed Application (DOS) No. 26 22 591 also describes an extruder, the screw of which comprises a thread which may, in a certain zone, have passages connecting its downstream side to the upstream side. The total surface of these passages may be on the order of 1–20% of the total cross-section of the thread. These passages are provided in a zone of the extruder where the screw and the cylinder are frustoconical in shape. Since the extruder is especially intended for treating mixtures of plastic materials to be extruded at high temperature and pressure, and since the cylinder of the extruder is equipped with heating elements, the passages provided in the compression zone mentioned above have essentially a stirring function and are intended to perfect the mixing of the plastic material. The zone of the screw in which the sole thread exhibits these passages corresponds to a zone of the cylinder having longitudinal grooves tending to force the pushing of the plastic material downstream.

The present invention relates to a screw-type extruder in which a thread of the screw likewise exhibits passages connecting its downstream side to its upstream side. However, it differs from the prior art extruders in that these passages are to be found only in the plasticizing zone and in that, within this zone, the cylinder is smooth and the screw comprises two threads overlapping one another and defining an entrance channel and an exit channel, the entrance channel being of decreasing cross-section while the exit channel is of increasing cross-section. The effect of this arrangement is not to activate the stirring of the plastic material in the plasticizing zone, but on the contrary to cause its orderly, regular flow from the entrance channel into the exit channel by forcing all the already more or less fluid particles of plastic material to pass successively in contact with or in immediate proximity to the metal of which the screw thread is made, in order to attain a homogeneous temperature which is that of the hub of the screw. As a matter of fact, it has been noticed that the feed zone in which the pellets or solid particles of plastic material are vigorously stirred is a calorigenic zone having the effect of heating the hub of the screw. The heat is thence transmitted downstream by conduction, so that passages made in the plasticizing zone with an arrangement such as that of the present invention ensure the homogenization of the temperatures by conduction and avoid localized overheating even when output is stepped up to the maximum.

The extruder described in Swiss Pat. No. 603,341 comprises a screw, the plasticizing zone of which is formed of two threads having differing pitches, one of which is cut by a multitude of narrow passages extending over the entire height of the thread. The cross-section of the passages, projected on a plane perpendicular to the axis of the screw, is on the order of 20% of the total cross-section of the thread. In this screw, the feed zone and the homogenization zone include threads of the same pitch as the pushing thread of the plasticizing zone, and it was found that this arrangement made it possible to increase the qualitative limit of useful output by about 50% as compared with a screw of conventional design.

It is an object of the present invention to further increase the qualitative limit of useful output of a screw-type extruder of given dimensions.

Studies have unexpectedly shown, in fact, that by combining a plasticizing zone such as that described in Swiss Pat. No. 603,341 with a feed zone comprising means for forcing the entrance of the plastic material into the cylinder and for creating a rapid increase in pressure and a high production of heat, it is possible to further increase, to an appreciable extent, the qualitative limit of useful output and, consequently, the output of homogenized plastic material which can be caused to leave an extruder of given dimensions. This combination allows the ratio between the total surface of the passages and the total cross-section of the thread to be increased beyond the 20% limit previously imposed.

To this end, the high-output screw-type extruder for plastic materials according to the present invention comprises a cylinder and a screw housed within the cylinder, driven rotatingly about its axis at a predetermined speed, and divided along its length into at least three successive zones including a feed zone, a plasticizing zone, and a homogenization zone, wherein the cylinder and/or the screw are formed in the feed zone in such a way as to overfeed the plasticizing zone; wherein, in the plasticizing zone, the cylindrical inner surface of the cylinder is smooth, and the screw has two spiral threads defining, together with the hub of the screw and the cylinder, an entrance channel of decreasing cross-section and an exit channel of increasing cross-section, conducting the plastic material toward the exit of the extruder and separated by one of the two threads; and wherein this thread is crossed by a series of narrow passages connecting its downstream side to its upstream side.

Figure 3:
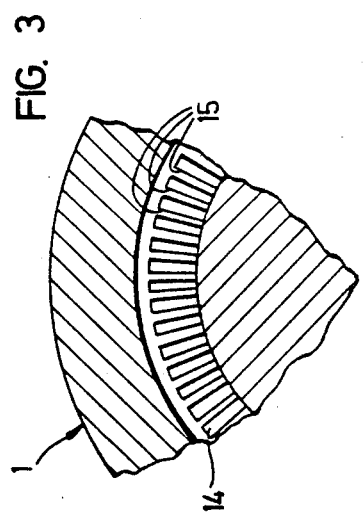
Figure 2:
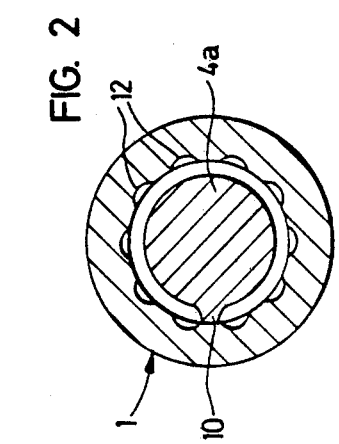
Figure 4:
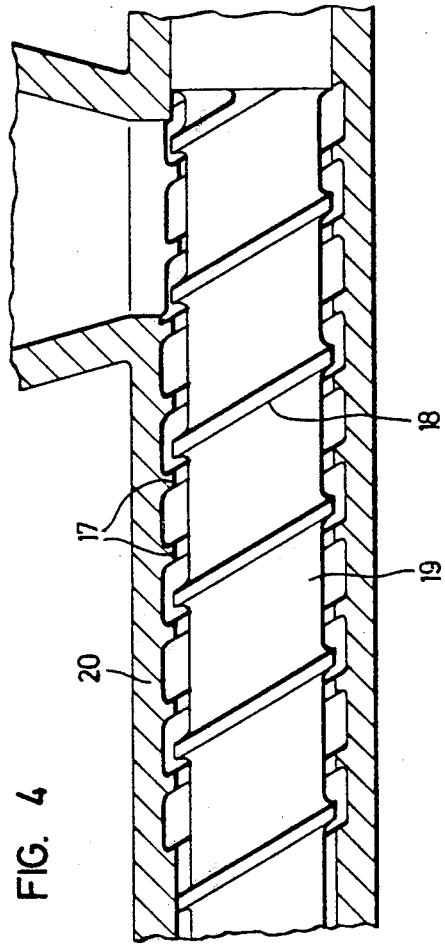
Figure 5:
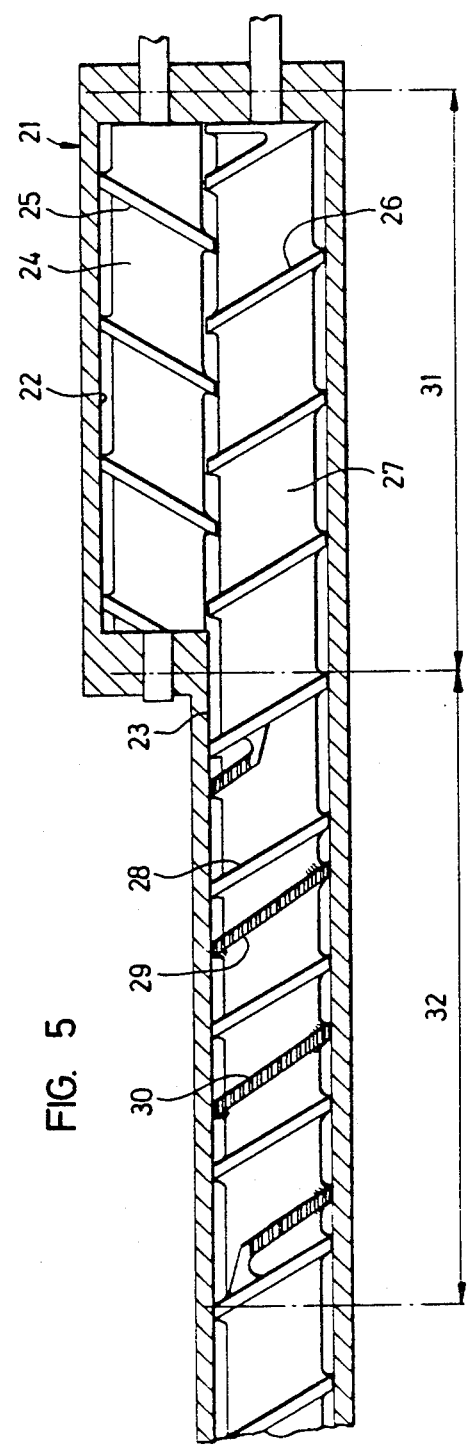

Preferred embodiments of the invention will now be described in detail with reference to the accompanying drawings, in which:

FIG. 1 is a partial longitudinal section of a first embodiment of the extruder,

FIG. 2 is a section taken on a plane perpendicular to the axis along the line II—II of FIG. 1, FIG. 3 is a partial section taken on the line III—III of FIG. 1, on a larger scale, FIG. 4 is a partial longitudinal section of a second embodiment, and FIG. 5 is a longitudinal section on a horizontal plane of the feed zone, the plasticizing zone, and part of the homogenization zone of a third embodiment of the extruder according to the invention.

FIG. 1 shows a cylinder 1 of an extruder, provided near its upstream end with a hopper 2 for introducing plastic material in powder or pellets. The cylindrical portion of cylinder 1 is extended toward the right, as viewed in FIG. 1, by an end element 3 comprising a bearing (not shown) for a screw 4 and means ensuring the fluid-tightness of screw 4 with respect to cylinder 1.

Screw 4, having a cylindrical hub 4a, includes at its upstream end a zone provided with coupling grooves 5 which enable it to be connected to a drive motor. Following zone 5 is a sealing zone 6 which includes a spiral groove of very short pitch, the direction of which is reversed with respect to that of the movement of the plastic material within cylinder 1.

Farther downstream, screw 4 then comprises a feed zone 7, a plasticizing zone 8, and a homogenization zone 9, the latter extending up to the downstream end of screw 4. In feed zone 7, the threading of screw 4 comprises two threads 10 and 11 of the same pitch, overlapping one another. This zone is located beneath the opening of hopper 2 and continues downstream for a certain distance within cylinder 1. Its function is to introduce into cylinder 1 the plastic material in pellets or powder contained in hopper 2, to compress it, and to cause it to be heated by the stirring and rubbing of the granules against one another or against the walls of cylinder 1, or against hub 4a of screw 4. In order to ensure that the granules are put under pressure and pushed along, cylinder 1 comprises in this zone parallel longitudinal grooves 12 extending from hopper 2 to the end of feed zone 7. Grooves 12 continue upstream to sealing zone 6. Their presence creates a forced pushing downstream of the plastic material. As may be seen in FIG. 1, thread 10 of screw 4 is interrupted before the end of feed zone 7 to form on screw 4 a transition zone 7a allowing the particles of plastic material to be evenly distributed.

In plasticizing zone 8, cylinder 1 is smooth, and screw 4 comprises two threads 13 and 14 of constant but different pitch. Thread 14 extends into the continuation of thread 11, whereas thread 13 has a shorter pitch. Thread 14 starts at the beginning of zone 8, gradually diverges from thread 13, then reapproaches it so that at the end of plasticizing zone 8, it rejoins thread 13 after having described a path comprising one turn less. Thread 14 extends over at least two complete turns. Instead of providing threads 13 and 14 having different pitches, an entrance channel of decreasing cross-section and an exit channel of increasing cross-section may also be formed by causing the depth of the channels to vary. In this case, the two threads may have the same pitch.

The summit surface of thread 14 is contained in a cylindrical surface coaxial with screw 4 and having a smaller diameter than the inside surface of cylinder 1. As for thread 13, its profile is the same as that of thread 14, i.e., its two sides are likewise surfaces inclined with respect to the cylindrical surface of hub 4a. However, the height of thread 13 may be slightly greater or less than that of thread 14, so that the clearance between this thread and cylinder 1 would be greater or less than the clearance between passing thread 14 and cylinder 1.

Passing thread 14 exhibits a multitude of slots 15 extending radially from the summit surface of the thread to the surface level of the hub of screw 4. Radial slots 15 extend along planes containing the axis of screw 4. Thus their traces on the surface of hub 4a are generatrices of that surface.

Homogenization zone 8 comprises a single thread 16 of constant pitch, equal to that of thread 13. This zone has a conventional structure which need not be described in detail here.

It has been found that the combination of a feed zone such as that described above with a homogenization zone in which one of the threads exhibits a multitude of radial passages in the form of slots unexpectedly makes it possible to obtain an increase in the qualitative limit of useful output going beyond what was previously obtained. For this purpose, the relative dimensions and number of the slots are different from what was indicated in prior Swiss Pat. No. 603,341. The width of the slots, while remaining less than their height, may be increased so that the total cross-section of the slots, projected on a plane perpendicular to the axis of the screw, attains a value greater than 20% of the total cross-section of the thread. The width of each slot will preferably be less than or equal to 3% of the diameter of the screw, the number of slots being such that the thread elements separated by the slots are still wider than the slots themselves in order to ensure conduction of the heat.

Contrary to what might be feared, the presence of overfeeding means in the entrance zone produces neither an overpressure within the cylinder nor excessive heating. On the contrary, owing to the possibility of widening the slots, it makes it possible to obtain an increase in the qualitative limit of useful output. Consequently, it makes it possible to increase the speed without excessive heating. The heat given off in the feed zone is transmitted to the plasticizing zone and thence, in an activated manner, to the material being plasticized.

The overfeeding effect obtained by longitudinal grooves 12 may equally well be obtained by other means. Thus, according to FIG. 4, a cylinder 20 of the extruder partially illustrated in FIG. 4 comprises in the feed zone two spiral ribs 17 overlapping one another and having a pitch which is equal, but in reverse direction with respect to a thread 18 of a screw 19. In this feed zone, screw 19 has only one thread. The plasticizing zone following the feed zone shown in FIG. 1 will be constituted as in FIG. 1 and will likewise comprise two threads of different pitch made on the screw, one of these threads being provided with slots such as slots 15.

Spiral ribs 17 of cylinder 16 cooperate with thread 18 of screw 19 to increase the effect of forcing the plastic material downstream.

In a modified embodiment, provision might equally well be made, in order to increase the output of plastic material forced toward the plasticizing zone, for a feed zone in which the cylinder and the screw would have a larger diameter than in the plasticizing and homogenization zones. On the other hand, it has been found preferable to retain the same diameter in the plasticizing zone and in the homogenization zone.

FIG. 5 shows still another means of causing overfeeding at the entrance of the plasticizing zone.

In a feed zone 31 of the extruder illustrated in this figure, cylinder 21 includes a cylindrical lateral widening 22 which communicates with the inside passage 23 of the cylinder. Housed in this widening is a screw section 24, the thread 25 of which has the same pitch as thread 26 of a feed zone of a screw 27. The hub of screw 27 is uniform in diameter throughout its length, and thread 26 is followed in a plasticizing zone 32 by a thread 28 of the same pitch and dimensions, from which there branches off a passing thread 29 provided with slots 30 analogous to slots 15. Threads 25 and 26 are engaged in one another, and screw section 24 is driven rotatingly in synchronization with screw 27 and in the opposite direction. Thus a forcible pushing of the plastic material toward plasticizing zone 32 is obtained.

The overfeeding means described above, used in combination with a plasticizing zone in which the screw includes a passing thread provided with numerous narrow slots or with holes, make it possible to increase the performance of the previously known extruders owing to the raising of the qualitative limit of useful output.

What is claimed is:

1. A high-output screw-type extruder for plastic materials comprising a cylinder and a screw housed within said cylinder, driven rotatingly about its axis at a predetermined speed, and divided along its length into at least three successive zones including a feed zone, a plasticizing zone, and a homogenization zone, wherein said cylinder or said screw or both are formed in said feed zone in such a way as to overfeed said plasticizing zone; wherein, in said plasticizing zone, the cylindrical inner surface of said cylinder is smooth, and said screw has two spiral threads defining, together with the hub of said screw and said cylinder, an entrance channel of decreasing cross-section and an exit channel of increasing cross-section, conducting said plastic material toward the exit of said extruder and separated by one of said two threads; and wherein this thread is crossed by a series of narrow passages connecting its downstream side to its upstream side.

2. The extruder of claim 1, wherein, in said feed zone, said cylinder includes at least one spiral groove, opposite in direction to the thread of said screw.

3. The extruder of claim 1, wherein, in said feed zone, said cylinder exhibits parallel longitudinal grooves.

4. The extruder of claim 1, wherein, in said feed zone, said cylinder exhibits a cylindrical chamber parallel to the passage containing said screw and communicating therewith, said chamber being occupied by an auxiliary screw element, the thread of which is engaged between the turns of the thread of said feed zone of said screw.

5. The extruder of claim 1, wherein, in said feed zone, said cylinder and said screw have a diameter greater than that of said plasticizing and homogenization zones.

6. The extruder of claim 1 and one of claims 2 to 5, wherein, in said plasticizing zone, said two threads of said screw are of different pitches and join one another at the beginning and at the end of said zone, said hub of said screw being cylindrical.

7. The extruder of claim 6, wherein the clearance between the thread provided with said passages and said cylinder is greater than the clearance between the other thread and said cylinder.

8. The extruder of claim 1 or claim 6, wherein the total surface of said passages passing through the thread is greater than 15% of the total cross-section of the thread.

9. The extruder of claim 6, wherein the thread provided with said passages is that having the longer pitch.

10. The extruder of claim 6, wherein said passages are radial slots disposed perpendicular or at an angle to the thread.

11. The extruder of claim 6, wherein said passages extend over at least 75% of the height of the thread, from its summit.

12. The extruder of claim 6 or claim 8, wherein the width of each slot, projected on a plane perpendicular to the axis of said screw, represents about 3% or less of the diameter of said screw.

13. The extruder of claim 6, wherein the width of each passage, measured in a plane perpendicular to the axis of said screw, is at most 5 mm.

* * * * *